United States Patent

Somich

[15] 3,674,708

[45] July 4, 1972

[54] IMPROVED BORON PHOSPHATE CATALYST

[72] Inventor: Robert T. Somich, Lake Jackson, Tex.

[73] Assignee: Monsanto Company, St. Louis, Mo.

[22] Filed: Dec. 2, 1970

[21] Appl. No.: 94,560

Related U.S. Application Data

[62] Division of Ser. No. 736,299, June 12, 1968, Pat. No. 3,574,700.

[52] U.S. Cl. .......................................... 252/432, 260/465.2
[51] Int. Cl. ........................................................ B01j 11/82
[58] Field of Search .................................................. 252/432

[56] References Cited

UNITED STATES PATENTS

| | | | |
|---|---|---|---|
| 2,668,175 | 2/1954 | Reppe et al. | 260/465.2 |
| 3,121,733 | 2/1964 | Von Schickh et al. | 260/465.2 |
| 3,308,202 | 3/1967 | De Gramont et al. | 252/432 X |
| 3,342,820 | 9/1967 | Brader | 252/432 X |

*Primary Examiner*—Patrick P. Garvin
*Attorney*—John W. Whisler, et al.

[57] ABSTRACT

Boron phosphate containing minor amounts of sulfate- and/or sodium-containing salts provides an improved dehydration catalyst for the synthesis of nitriles from carboxylic compounds or derivatives thereof and ammonia.

5 Claims, No Drawings

BORON PHOSPHATE CATALYST

This application is a division of my copending U.S. application Ser. No. 736,299, filed June 12, 1968, and now U.S. Pat. No. 3,574,700.

BACKGROUND OF THE INVENTION

The present invention relates to an improved catalyst for use in synthesizing nitriles by the process comprising passing a vaporized mixture of a carboxylic compound and ammonia over a catalyst.

Nitriles are important intermediates for the synthesis of polyamides, e.g., polyhexamethylene adipamide (nylon 6,6), and their preparation has been the subject of many investigations. In the synthesis of nitriles from carboxylic compounds, e.g., carboxylic acids, and ammonia by passing a vaporized mixture thereof over a suitable catalyst, many competing reactions are involved. One reaction leads to the formation of nitrile; another to the formation of ketone. The ketone reaction is undesirable since the ketones must be separated from the nitrile and also since ketones tend to undergo polymerization and decomposition at the temperatures required for nitrile formation which results in deterioration of the catalyst.

Boron phosphate is known to be an effective catalyst in promoting nitrile formation. For example, in the continuous process for synthesizing adiponitrile from adipic acid and ammonia at temperatures ranging from 300° – 550° C., adiponitrile is attained in high yields. When the conversion of acid to nitrile falls below a level which results in an anhydrous and ammonia-free crude product containing less than 90–91 percent adiponitrile, the useful life of the catalyst is usually considered to have lapsed.

The useful life of boron phosphate catalyst in the vapor phase adiponitrile process is only about 70–80 pounds of adipic acid throughput per pound of catalyst. When the useful life of the catalyst has lapsed, the catalyst is referred to as "spent catalyst" and must be removed from the process and replenished with fresh catalyst. Changing the catalyst involves considerable man-hours, during which time the process must be shut down to effect the change. These factors coupled with the cost per se of the catalyst contribute to the overall cost of manufacturing adiponitrile. A primary object of the present invention, therefore, is to increase the useful life of boron phosphate catalyst in vapor phase nitrile synthesis processes and thereby reduce the cost of preparing the nitrile.

SUMMARY OF THE INVENTION

The present invention provides an improved catalyst for use in synthesizing nitriles from a vaporized mixture of a carboxylic compound and ammonia, comprising boron phosphate containing at least one salt selected from sodium- and sulfate-containing salts in amounts sufficient to provide at least 0.009 percent and preferably from 0.5–1 percent or more by weight of sodium, and at least 0.03 percent, and preferably from 0.05–0.1 percent or more by weight of sulfate.

Boron phosphate is conventionally prepared by reacting a slight molar excess of phosphoric acid with boric acid in the cold, and isolating and baking the product at about 350° C. until a hard mass is formed as described in U.S. Pat. No. 2,200,734 issued to Arnold and Lazier. The catalyst of the present invention, referred to herein as "modified boron phosphate," may be prepared by adding a sodium- and/or sulfate-containing salt to boric acid and then reacting the salt-containing boric acid with phosphoric acid in the manner described in U.S. Pat. No. 2,200,734.

Suitable sodium- and sulfate-containing salts, although not limited thereto, include, for example, alkali and alkaline earth metal sulfates and sodium salts of inorganic acids, e.g., sodium phosphate, chloride, borate, etc. Any sodium or sulfate salt may be used to provide the modified boron phosphate which does not adversely affect formation of the nitrile, e.g., the purity or yield thereof. Preferred salts are sodium sulfate and sodium borates, e.g., sodium tetraborate polyhydrates.

Preparation of nitriles by reacting nitrile-producing materials and ammonia in the presence of a suitable catalyst at elevated temperatures is well known in the prior art and, therefore, is not discussed in detail herein. Prior art relating to nitrile synthesis of this type include U.S. Pat. Nos. 2,200,734; 2,377,795; 2,646,344; 3,282,859; and 3,324,165.

PREFERRED EMBODIMENT OF THE INVENTION

CATALYST PREPARATION

Sodium tetraborate pentahydrate (30 lbs.) and 0.83 lbs. of anhydrous sodium sulfate were added to 400 lbs. of boric acid. The combined materials were added to 880 lbs. of 87 percent phosphoric acid and mixed for 30 minutes. The resulting paste was dried at 150° C. for 18 hours, ignited at 350° C. for 7 hours, and granulated and screened. Normally, the boron phosphate catalyst is prepared using 400 lbs. of boric acid and 817 lbs. of phosphoric acid, processed in the same manner.

ADIPONITRILE PREPARATION

The modified boron phosphate catalyst prepared above was charged to a multitube tube and shell converter and a mixture of vaporized adipic acid and ammonia at a 1:1 weight ratio was passed over the catalyst at a uniform rate. The feed mixture temperature was 450° C. and hot flue gas was circulated through the converter shell to maintain a catalyst bed temperature of about 370° C. The product was condensed to form an aqueous crude adiponitrile solution and some adiponitrile mist which was scrubbed with crude adiponitrile. At this point ammonia was removed as an off-gas and the adiponitrile was collected, purified sequentially by distillation, chemical purification, caustic treatment, washing and further distillation. The conversion, based on adiponitrile content of the anhydrous ammonia-free crude product, was 93.40 percent. The useful life of the modified catalyst was 116 pounds of adipic acid throughput per pound of catalyst. At this point the adiponitrile content in the anhydrous and ammonia-free crude product had dropped below 93 percent. The conversion level was determined by continuous sampling and analysis of the crude product.

The useful life of normal boron phosphate catalyst was determined by the above procedure using identical amounts of catalyst and reactants and found to be about 77 pounds of adipic acid per pound of catalyst.

Comparison of Modified Catalyst to Normal Catalyst Re Conversion Levels

Twelve runs were made according to the above adiponitrile preparation procedure to determine the useful catalyst life for modified boron phosphate catalyst and for normal boron phosphate catalyst; the average conversion, expressed as percent adiponitrile in the anhydrous and ammonia-free crude product was also determined. Six runs were made with each catalyst under as nearly identical conditions as possible. The results of these determinations are given in Table 1.

TABLE 1

| Run | Modified Catalyst Throughput, Lbs. Adipic Acid/Lb. Catalyst | Conversion, % | Normal Catalyst Throughput, Lbs. Adipic Acid/Lb. Catalyst | Conversion, % |
| --- | --- | --- | --- | --- |
| 1 | 92 | 94.07 | | |
| 2 | | | 77 | 94.41 |
| 3 | 84 | 94.30 | | |
| 4 | | | 71 | 93.69 |
| 5 | 95 | 94.34 | | |
| 6 | | | 66 | 93.18 |
| 7 | 90 | 93.75 | | |
| 8 | | | 63 | 94.32 |
| 9 | 115 | 93.49 | | |
| 10 | | | 71 | 94.56 |
| 11 | 105 | 94.16 | | |
| 12 | | | 71 | 93.86 |

The results shown in Table 1 clearly indicate that the modified boron phosphate of the present invention provides an improved catalyst for the synthesis of adiponitrile from adipic acid and ammonia. The throughputs from the modified catalyst were significantly better than that from the normal boron phosphate catalyst and provided substantially the same conversion. The increase in adipic acid throughput permits fewer catalyst changes, thereby reducing the man-hours required in the maintenance of the synthesis.

The addition of even trace amounts of either sulfate or sodium salts to boron phosphate results in a measurable improvement in the function of the catalyst in nitrile synthesis. Best results are attained, however, when the boron phosphate catalyst contains from 0.03–5 percent on weight of sulfate and/or from 0.009–5 percent on weight of sodium; greater quantities can be added to boron phosphate, but at concentrations greater than about 5 percent no significant increase in catalyst life is observed. Instead of preparing the modified boron phosphate by adding the salts to the boric acid prior to reacting it with the phosphoric acid, alternately the salts may be added to the phosphoric acid or the modified boron phosphate may be prepared by any other means whereby sulfate and/or sodium-containing boron phosphate is attained.

Thus far, owing to the commercial importance of adiponitrile, the modified catalyst has been used primarily to promote adiponitrile formation in the conventional vapor phase reaction of ammonia with adipic acid. However, the modified catalyst may be used in any way or manner in which normal boron phosphate may be used, for example, to prepare other nitriles by the vapor phase reaction of any monobasic acid or other dibasic acid (or their amide or ammonium salts) with ammonia. Thus, the modified catalyst may be used in the preparation of saturated or unsaturated mononitriles or dinitriles from $C_2$ to $C_{20}$ mono- or dibasic fatty acids, or in the preparation of ortho-phthalonitrile from phthalic acid.

What is claimed is:

1. A dehydration catalyst consisting essentially of boron phosphate and at least one salt selected from the group consisting of sodium and sulfate salts, said sodium salt being a salt of an inorganic acid in the amount of 0.009 to 5 percent by weight and said sulfate salt being an alkali or alkaline earth metal sulfate in the amount of 0.03–5 percent by weight.

2. The catalyst of claim 1 wherein the salt is selected from the group consisting of sodium sulfate and sodium borates.

3. The catalyst of claim 1 wherein the catalyst contains a sodium salt and sulfate salt.

4. The catalyst of claim 2 wherein the sodium borate is sodium tetraborate pentahydrate.

5. The catalyst of claim 3 wherein the sodium salt is sodium tetraborate pentahydrate and the sulfate salt is sodium sulfate.

* * * * *